United States Patent [19]

Zuege

[11] 3,999,599
[45] Dec. 28, 1976

[54] CONDENSATE PAN FOR EVAPORATOR CORE IN VEHICLE AIR CONDITIONING SYSTEM

[75] Inventor: Charles F. Zuege, Milwaukee, Wis.

[73] Assignee: Allis-Chalmers Corporation, Milwaukee, Wis.

[22] Filed: Nov. 25, 1974

[21] Appl. No.: 527,011

[52] U.S. Cl. .................... 165/43; 62/244; 62/285; 62/291; 165/42
[51] Int. Cl.² ........................ B60H 3/04
[58] Field of Search ..... 62/285, 291, 244, DIG. 16, 62/239, 243; 165/42, 43

[56] References Cited
UNITED STATES PATENTS

| | | | |
|---|---|---|---|
| 2,032,572 | 3/1936 | Hammers | 62/DIG. 16 |
| 2,738,652 | 3/1956 | Philipp | 62/244 |
| 3,007,323 | 11/1961 | Millington | 62/244 |
| 3,057,171 | 10/1962 | Hulse | 62/244 |
| 3,434,300 | 3/1969 | Rueth | 62/239 |
| 3,543,838 | 12/1970 | White | 165/42 |
| 3,555,846 | 1/1971 | Harbeck | 165/42 |
| 3,670,808 | 6/1972 | Wait | 165/42 |
| 3,724,233 | 4/1973 | Pugh | 62/285 |
| 3,774,408 | 11/1973 | Pruehs | 62/291 |
| 3,845,875 | 11/1974 | Douglas et al. | 220/20 |
| 3,848,428 | 11/1974 | Rieter | 62/285 |

*Primary Examiner*—William E. Wayner
*Assistant Examiner*—Henry C. Yuen
*Attorney, Agent, or Firm*—Arthur L. Nelson

[57] ABSTRACT

A condensate pan for the evaporator core in a vehicle air conditioning system. The condensate pan is constructed of an insulating material forming a liquid-tight surface on the walls of the condensate pan.

1 Claim, 5 Drawing Figures

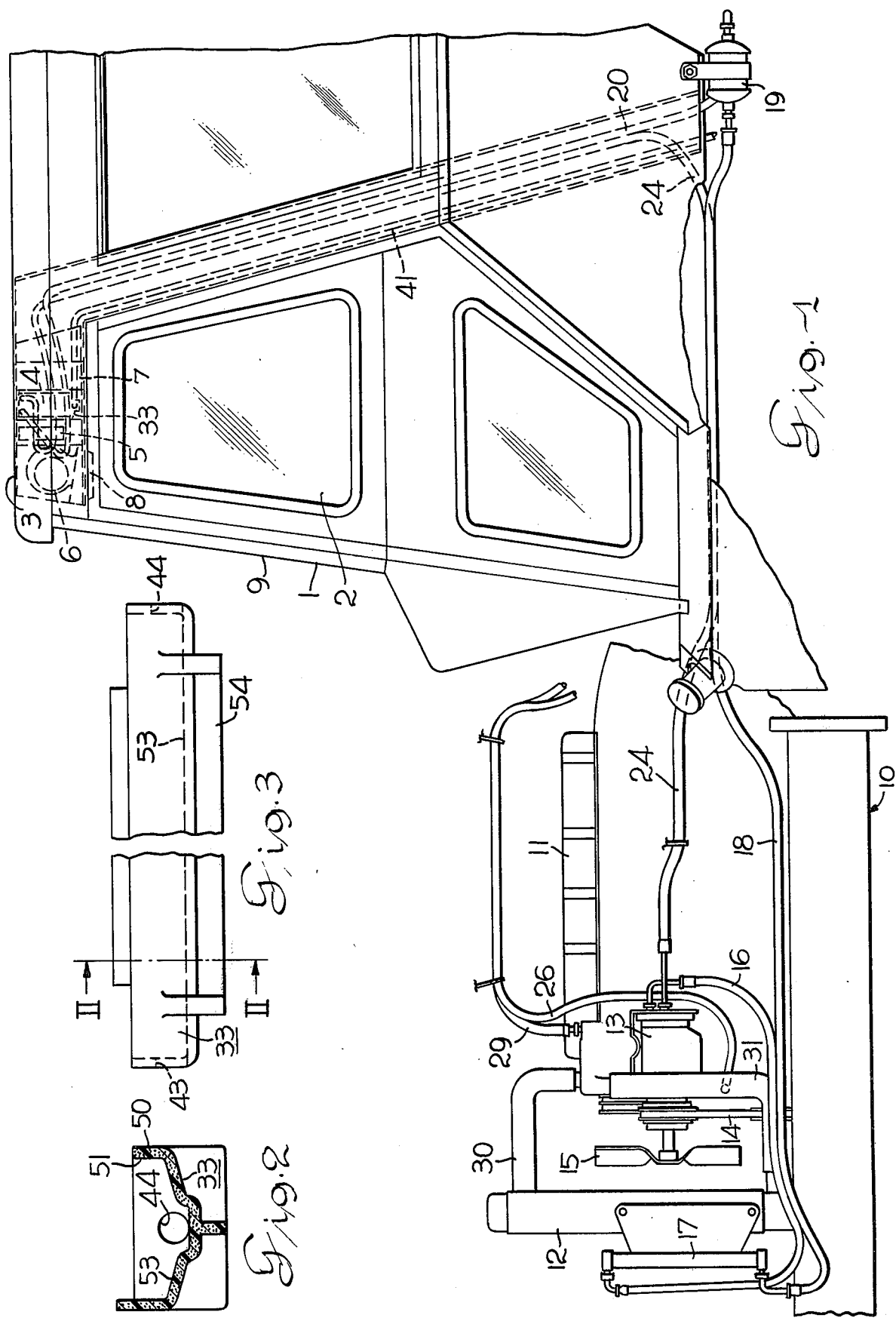

CONDENSATE PAN FOR EVAPORATOR CORE IN VEHICLE AIR CONDITIONING SYSTEM

This invention relates to a refrigeration system for a tractor and more particularly to a condensate pan for an evaporator core formed of a lightweight insulating material having a fluid-tight sealing surface on the walls of the pan.

The conventional refrigeration circuit includes a compressor for compressing the refrigerant which is transmitted through conduit means to a condensor wherein the heat is extracted from the refrigerant and the refrigerant is then conveyed to a receiver for holding the refrigerant until used in the refrigeration process. Conventionally, these components are mounted on the vehicle chassis. The condensor is usually provided with either a water-cooled or an air-cooled heat exchanger to extract the heat from the refrigerant. This can be positioned on the radiator in which air is drawn through the condensor as well as the radiator cooling the engine. The refrigerating components include, basically, the expansion valve and expansion coils which the refrigerant has expanded where it takes on heat and cools the surrounding conduits and fins in the process of expansion. The expansion coil, sometimes known as the evaporator core, provides the cooling process for cooling the passenger compartment of the vehicle. In combination with the evaporator core, a heating coil is also provided in some vehicles to provide for heating of the passenger compartment as well as when the ambient temperature of the vehicle is below the comfort levels. Accordingly, some type of forced ventilation is provided to force air through the evaporator core and in contact with the fins which cool the air as it passes through an air conduit which directs the air through the heater coils as well. Control means is provided to operate the expansion valve for air conditioning or a control valve to control the flow of heating fluid through the heating coils. The evaporator core and heating coils are often mounted in the dashboard of the vehicle and the weight of the condensate pan is unimportant. Conventionally, condensate pans are constructed of metal with insulation applied to the outer surface of the pan. Metal pans have a tendency to rust or corrode and are not as economical as other materials.

With the evaporator core mounted between the roof and ceiling structure of the vehicle, it is desirable to have a lightweight water-tight construction for the condensate pan which conveys condensed water from the air that is passed over the evaporator core. A lightweight construction for a condensate pan permits the mounting of the evaporator coil on the roof structure without placing excess burden on the superstructure of the vehicle. Accordingly, this invention provides such a condensate pan which is capable of providing insulating qualities surrounding the evaporator to provide efficient refrigeration and also to provide a condensate pan for the condensation of the moisture in the air as it is cooled below its dew point while passing through the evaporator core. Accordingly, the condensate pan of this invention has also fluid-tight sealing surfaces which are impervious to water and can easily be supported on the evaporator core to provide a condensate pan adapted for mounting in the roofing structure of the vehicle cab.

It is an object of this invention to provide a condensate pan of insulating fluid-tight material.

It is another object of this invention to provide a refrigeration system for a tractor having an evaporator core condensate pan for mounting on the ceiling of a cab. The condensate pan is constructed of a lightweight water impervious insulating material for receiving condensate during the refrigerating process of the air conditioning of the vehicle cab.

It is a further object of this invention to provide a refrigeration system for a tractor having an evaporator condensate pan of insulating material forming a fluid-tight surface on the walls of the condensate pan around the evaporator core in the ceiling of a vehicle cab.

The objects of this invention are accomplished in a refrigeration system on the cab of the tractor. An engine driven compressor and a condensor and receiver are mounted on the vehicle chassis which provide refrigerant to the expansion valve in the roof of the cab of the vehicle for supplying refrigerant to the evaporator core mounted between the roof panel and the ceiling of the cab. A condensate pan supported on the underside of the evaporator core is constructed of an insulating material which has a waterproof surface surrounding all portions of the insulating material to avoid saturation of the insulation by the condensate in the condensate pan from condensed moisture in the air passed around the evaporator core. The evaporator core consists of a tubular structure having fins for absorbing heat from the air as it is passed through the conduit leading between the inlet and the outlet in the air conditioning system. It is imperative that the insulating quality of the insulating material be maintained at a high efficiency and also that the condensate not be formed on the lower surface of the condensate pan which again would produce dripping on the inside of the vehicle cab with humid conditions of the ambient air. Accordingly, this invention provides for a lightweight foam structure with a skin forming the surfaces of the pan to make the pan impervious to water and of lightweight construction so that it can be suspended from the roof structure of the vehicle. Suitable drainage passages are in communication with the condensate pan to drain the condensate from the condensate pan while the air conditioning unit is in operation.

The preferred embodiments of this invention are illustrated in the attached drawings:

FIG. 1 illustrates the cab structure supporting the evaporator core and the condensate pan and the compressor, condensor and receiver mounted on the vehicle engine and chassis structure.

FIG. 2 is a cross section view taken on line II—II of FIG. 3 showing the condensate pan for the evaporator core;

FIG. 3 is a side elevation view of the condensate pan for the evaporator core;

Figure 4:
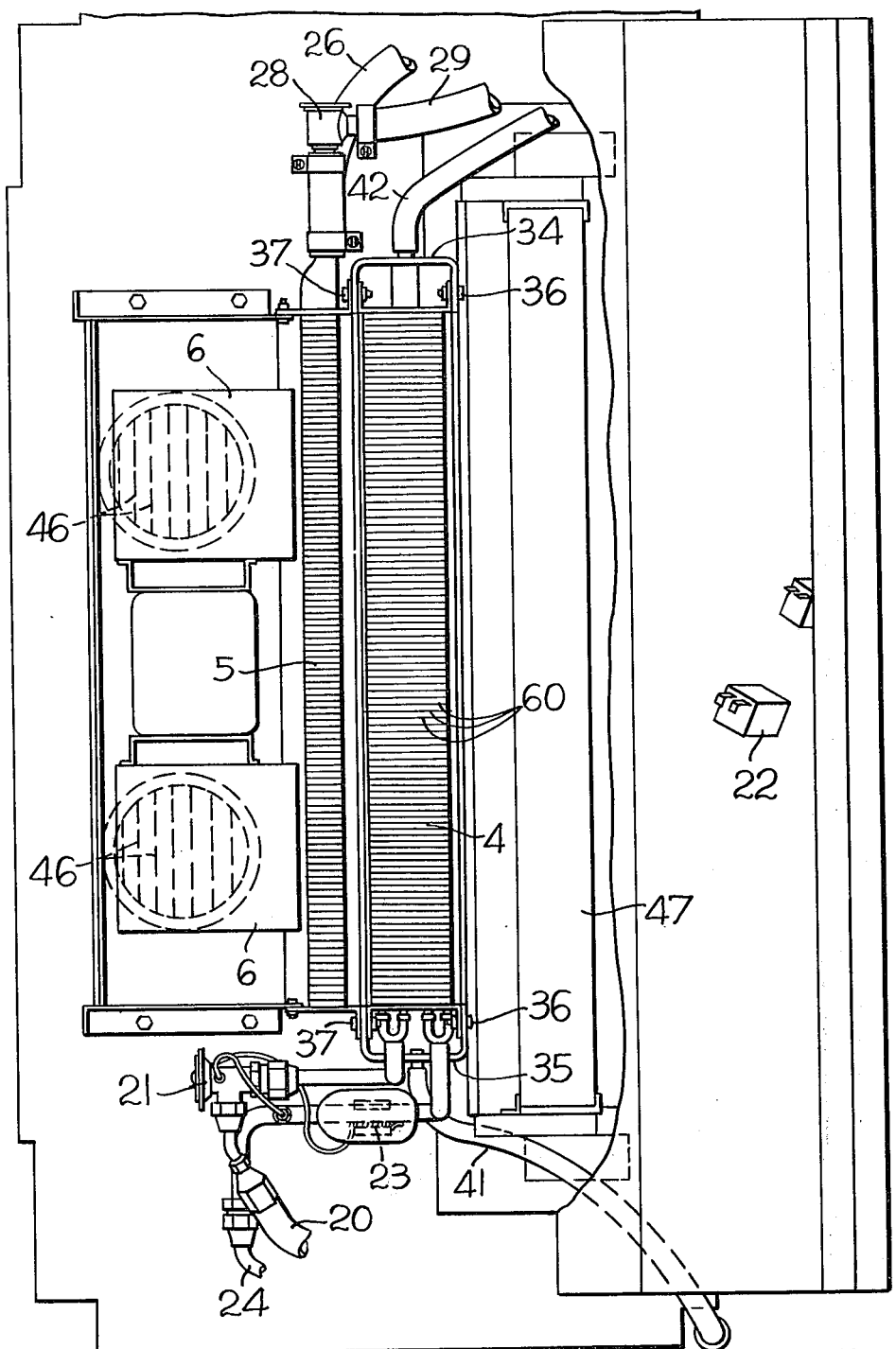
FIG. 4 illustrates a plan view of the evaporator core and related components of the air conditioning system.
Figure 5:
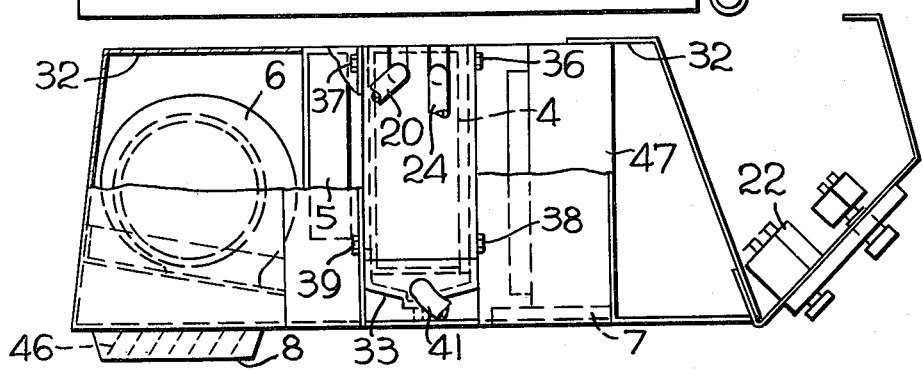
FIG. 5 illustrates a side view partially in section showing the components of the refrigerating system and the air flow through the conduit between the inlet and outlet.

Referring to the drawings, the preferred embodiment of this invention will be described. FIG. 1 illustrates a cab 1 forming a passenger compartment 2 which is to be provided with air conditioning. The roof panel 3 and side panels of the cab support the evaporator 4 and heating coils 5 as well as the fans 6 for providing for circulation of air through the core and coils. The inlet 7 permits the flow of air for recirculation within the cab as the air flows through the core and coils and out the outlet 8 where the air conditioned air is deflected against the windshield 9.

FIG. 1 also shows the vehicle chassis 10 which supports an engine 11 and a radiator 12. The compressor 13 is supported on the engine 11 and driven by a fan belt 14 which also drives a fan 15. The compressor compresses the refrigerant and the refrigerant is then conveyed through the refrigerant line 16 to the condensor 17 which is an air-cooled heat transfer device. The refrigerant in the condensor is cooled and passed through the refrigerant line 18 to the receiver 19 which is mounted on the vehicle chassis 10. A refrigerant line 20 transmits the refrigerant to the expansion valve 21 which supplies refrigerant to the evaporator core 4. The expansion valve is operator controlled through the control 22 and also the automatic sensor switch 23. The expansion valve allows the refrigerant to expand in the evaporator core 4 and a refrigerant is then passed through a refrigerant return line 24 to the compressor 13.

Also provided in the air conditioning system is heater lines 26 which supply heating fluid to the heater coils 5 which are controlled by the control valve 28. The heater coils 5 return the engine coolant fluid through the line 29. Suitable connecting hoses 30 and 31 connect the coolant fluid passages in the engine with the radiator 12. Accordingly, the air conditioning system includes a cooling system consisting of the evaporator core and the refrigerant in the system as well as the coolant fluid for the engine cooling system which is automatically controlled at approximately 180° which provide a heating fluid in the heater system for the passenger compartment of the cab 1.

The evaporator core has suitable structure 32 connected to the roof panel 3 for support on the roof panel. The condensate pan 33 is positioned immediately below the evaporator core 4. Mounted on the end of the evaporator core 4 is a pair of end panels 34 and 35. The end panels are fastened to the evaporator core by means of a plurality of bolts 36, 37, 38 and 39. The drain lines 41 and 42 are connected to the drain passages 43 and 44 in the condensate pan. Suitable rotatable deflectors 46 are provided at the air outlet of the air-cooling system. A filter 47 is positioned intermediate the inlet 7 and the evaporator core 4.

The condensate pan is shown in FIGS. 2 and 3. FIG. 2 is a cross section view showing the impervious skin 50 and 51 defining the inner and outer surface of the condensate pan 33. The inner structure of the walls forming the condensate pan 33 is a cellular structure forming air cells in the walls of the condensate pan. The dead air space formed by the cellular structure defines an insulating construction for the condensate pan. The surface of the condensate pan being impervious to water will prevent any moisture from penetrating the walls of the condensate pan and any moisture collected in the condensate pan will be passed to the drain lines through the passages of which passages 43 and 44 are shown in FIGS. 2 and 3.

FIG. 3 shows a side elevation view of the condensate pan and the chamber 53 for receiving the lower end of the evaporator core. Supporting structure 54 supports the condensate pan and forms a barrier to prevent air from passing underneath the condensate pan as air flows across the evaporator core. The evaporator core and the heater coils in the air conditioning system are in series. The operation of this device will be described in the following paragraphs.

The vehicle engine 11 drives the compressor 13 for compressing the refrigerant which is supplied to the condensor 17. The condensor 17 cools the refrigerant and passes the refrigerant to the receiver 19 which is mounted on the vehicle chassis. Refrigerant in the receiver 19 is supplied to the expansion valve 21 which is controlled by the operator of the vehicle and temperatures are also automatically sensed to supply the proper amount of refrigerant to the evaporator core 4. Evaporator core 4 includes a plurality of fins 60 around which the passing air column is in contact for cooling of the air by the core 4 as it passes through the refrigerating process. During the process of cooling the air, the air is often cooled below its dew point causing a condensation of the moisture in the air which is deposited on the fins 60 and drips into the condensate pan 33. The air continues to pass through the heater coils 5 which are usually not conveying fluid to heat the air when the air conditioning unit is on. Air then passes through the fans 6 out of the outlets 8 which includes deflectors 46 for deflecting the air against the windshield 9 as it is forced into the passenger compartment. Suitable deflectors may be provided for taking incoming air from the ambient air surrounding the cab or for recirculating air within the passenger compartment.

During the process of air conditioning, the air which is cooled condenses on the fins 60 of the evaporator core 4 causing a dripping of the condensate into the condensate pan 33. The condensate pan 33 is constructed with side panels of insulating material which will prevent moisture from condensing on the side of the evaporator core. Accordingly, the air which passes across the evaporator core 4 causes condensate to drip within the condensate pan 33 which is fluid-tight and provides an insulating quality to prevent condensate on the outside of the condensate pan which may, in turn, condense and then cause the ceiling of the cab to become wet. The moisture within the condensate pan is drained through the conduits 41 and 42 to a suitable draining position outside of the cab. The condensate pan provides the insulating quality necessary for this type of operation and also has a surface impervious to water to maintain the water in the pan and prevent the insulation from becoming inefficient by loading up with moisture. The condensate pan is lightweight and, although it bears on the ceiling, its weight is supported primarily from the evaporator core from which it is fastened.

The embodiments of the invention in which an exclusive property or privilege is claimed are defined as follows:

1. An air conditioning system for a tractor comprising, a compressor driven by engine generated energy, a condensor, a vehicle cab defining a passenger compartment including a windshield, a roof panel and a ceiling in spaced relation defining an air passage, an evaporator core having an expansion valve and a heater positioned between said roof panel and ceiling transverse of the air passage with control means for controlling the temperature and humidity of air flowing through said passage, means supporting said evaporator core on said roof panel, an inlet connected to said air passage upstream of said evaporator core and an outlet having a deflector connected to said air passage downstream of said evaporator core for deflecting air on said windshield, a motor driven fan in said passage inducing circulation through said air passage for passing air across said evaporator core and heater, a lightweight condensate pan positioned immediately below said evaporator core consisting of urethane foam of closed cellular foam structure forming air cells in the entire structure of said condensate pan providing insulating quality in the walls of said condensate pan, means supporting said condensate pan on said evaporator core to provide drainage of condensate into said condensate pan, a base structure forming reinforcing ridges defining a partition means on said pan engaging the ceiling providing a partition intermediate the portion at said condensate pan containing condensate and the ceiling for directing air passage across said evaporator core, side panel portions mounted vertically on the side of said evaporator core directing condensate into the base structure, a liquid impervious skin surface of the urethane foam forming the interior and external surfaces of the walls of said condensate pan providing a barrier impervious to water, a drain passage means in said condensate pan for draining condensate from said evaporator core in said air conditioning system.

* * * * *